United States Patent [19]

Wu et al.

[11] Patent Number: 5,761,652
[45] Date of Patent: Jun. 2, 1998

[54] CONSTRUCTING BALANCED MULTIDIMENSIONAL RANGE-BASED BITMAP INDICES

[75] Inventors: Kun-Lung Wu, Yorktown Heights; Philip Shi-lung Yu, Chappaqua, both of N.Y.

[73] Assignee: International Business Machines Corporation, Armonk, N.Y.

[21] Appl. No.: 618,736

[22] Filed: Mar. 20, 1996

[51] Int. Cl.[6] .................................................. G06F 9/355
[52] U.S. Cl. .......................... 707/2; 707/100; 707/101; 707/102; 707/205
[58] Field of Search ............................ 395/612, 611, 395/613, 621; 707/2, 100, 101, 102, 205

[56] References Cited

U.S. PATENT DOCUMENTS

| | | | |
|---|---|---|---|
| 4,606,002 | 8/1986 | Waisman et al. | 364/200 |
| 5,257,365 | 10/1993 | Powers et al. | 395/600 |
| 5,276,872 | 1/1994 | Lomet et al. | 395/600 |
| 5,495,608 | 2/1996 | Antoshenkov | 395/600 |
| 5,537,589 | 7/1996 | Dalal | 395/600 |
| 5,551,027 | 8/1996 | Choy et al. | 395/600 |
| 5,625,815 | 4/1997 | Maier et al. | 395/608 |

OTHER PUBLICATIONS

Nakayama et al., "Hash-Partitioned Join Method Using Dynamic Destaging Strategy", Proceedings of the 14th VLDB Conference, Los Angeles, California, (1988), pp. 468–478.

Kitsuregawa et al., "The Effect of Bucket Size Tuning in the Dynamic Hybrid GRACE Hash Join Method", Proceedings of the Fifteenth International conference on Very Large Data Bases, Amsterdam, (1989), pp. 257–265.

Salem et al., "Probabilistic Diagnosis of Hot Spots", IEEE, (1992), Jul. 1992. pp. 30–39.

Akyurek et al., "Adaptive Block Rearrangement", IEEE, (1993). pp. 182–189.

Lomet et al., "The hB-Tree: A Multiattribute Indexing Method with Good Guaranteed Performance", ACM Transactions on Database Systems, vol. 15, No. 4, Dec. 1990, pp. 625–658.

Nievergelt et al., "The Grid File: An Adaptable, Symmetric Multikey File Structure", ACM Transactions on Database Systems, vol.9, No. 1, Mar. 1984, pp. 38–71.

Antonin Guttman. "R–Trees: A Dynamic Index Structure for Spatial Searching", ACM 0-89791-128-8/84/006/0047, pp. 47–57, 1984.

John T. Robinson, "The K–D–B–Tree: A Search Structure for Large Multidimensional Dynamic Indexes", appeared in Proceedings of 1981 ACM SIGMOD, pp. 10–18, 1981.

Jon L. Bentley, "Multidimensional Binary Search Trees in Database Applications", Transactions on Software Engineering, vol. SE-5, No. 4, Jul. 1979, pp. 333–340.

Primary Examiner—Thomas G. Black
Assistant Examiner—Jean R. Homere
Attorney, Agent, or Firm—Kevin M. Jordan

[57] ABSTRACT

A computerized method of building balanced ranges of attribute values for multiple attributes of a database simultaneously without requiring presorting of the database. The balanced ranges are used to construct balanced range-based multidimensional bitmap indexes for processing complex multipredicate queries against the database. A dynamic partition expansion and contraction method can construct balanced ranges for bitmap indexing of tuples having high cardinality attributes and even in the presence of highly skewed data.

24 Claims, 7 Drawing Sheets

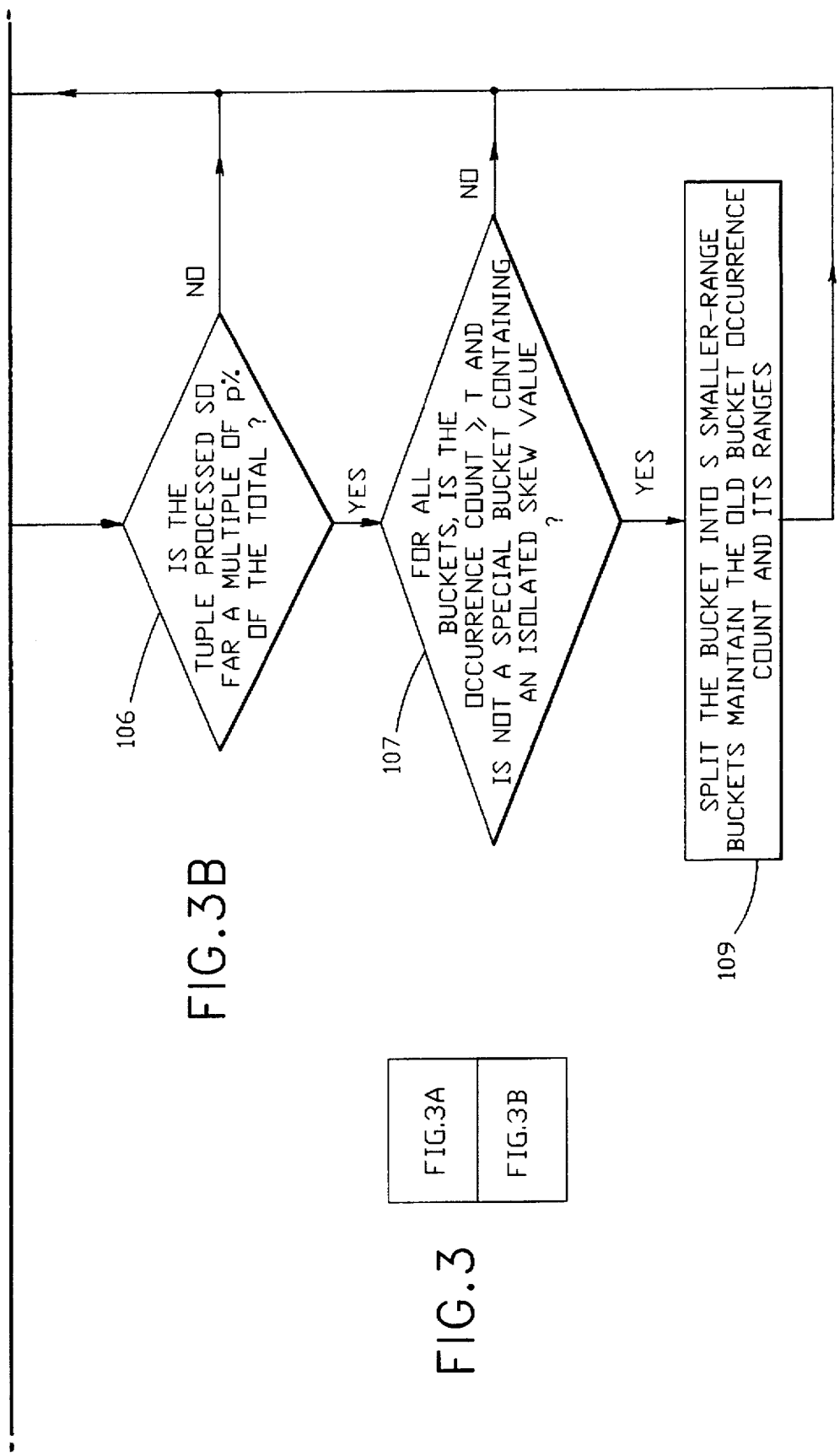

CONSTRUCTING BALANCED MULTIDIMENSIONAL RANGE-BASED BITMAP INDICES

The present invention was made under contract NCC5-101 Granted by National Aeronautics and Space Administration/Cooperative Agreement Notices (NASA/CAN). The Government has certain rights in the present invention.

FIELD OF INVENTION

The present invention is related to computer-based methods for storing data, and in particular to an improved computer data base system for storing and accessing large amounts of data.

BACKGROUND OF THE INVENTION

Multidimensional data analysis has become increasingly important for database management systems as increasingly complex queries with multiattribute predicates are posted against ever larger amounts of data in a data warehouse. To efficiently handle multidimensional data analysis, an effective multidimensional index structure is usually required. There are various known multidimensional index structures, such as the k-d trees presented in "Multi-dimensional binary search trees in database applications", by J. L. Bentley in *IEEE Trans. on Software Engineering*, 5(4):333–340, 1979; the k-d-b trees presented in "The K-D-B trees: A search structure for large multidimensional dynamic indexes," by J. Robinson, in *Proc. of 1981 ACM SIGMOD International Conf. on Management of Data*, pp. 10–18, 1981; the hB-trees presented in "The hB-tree: A Multiattribute indexing method with good guaranteed performance," by D. B. Lomet and B. Salzberg in *ACM Trans. on Database Systems*, 15(4):625–658, 1990; the R-trees presented in "R-trees: A dynamic index structure for spatial searching," by A. Guttman in *Proc. of 1984 ACM SIGMOD International Conf. on Management of Data*, pp. 47–57, 1984; the Quad-trees presented in *Design and Analysis of Spatial Data Structure*, by H. Samet, Addision-Wesley, 1990; the grid files presented in "The grid file: An adaptable, symmetric multikey file structure," by J. Nievergelt, H. Hinterberger and K. C. Sevcik in *ACM Trans. on Database Systems*, 9(1):38–71, 1984; and the bitmap indexing discussed in *The Art of Computer Programming, Vol 3: Sorting and Searching*, by D. E. Knuth, Addison-Wesley, 1973.

Bitmap indexes is potentially the easiest to build and maintain of the aforementioned multidimensional index structures. To build a multidimensional bitmap index for a table of IV records, a separate bitmap vector of length N bits is used to represent each distinct attribute value. Each bit in a bitmap vector represents one record, indicating whether or not the record has the matching attribute value represented by the bitmap vector. Records that satisfy multiattribute predicates can be identified by simple bitwise logical AND/OR operations using the corresponding bitmap vectors. For example, Table 1 shows the ticker symbol, trading volume, closing price and the listed stock exchange for 12 selected stocks on Oct. 18, 1995. Assume that we want to build a multidimensional bitmap index consisting of 3 attributes: "trading volume," "closing price" and "exchange". A bitmap vector of length 12 bits can be used for each distinct attribute value of the 3 indexed attributes. The attribute "exchange" requires only two bitmap vectors since there are only two distinct values: NASDAQ and NYSE. The NASDAQ and NYSE bitmap vectors can be represented as follows:

NASDAQ: (1 0 0 0 0 1 0 0 0 1 1 1);
NYSE: (0 1 1 1 1 0 1 1 1 0 0 0).

Here, the 1's in the NASDAQ vector indicate that the records corresponding to Record IDs 1, 6, 10, 11 and 12 in Table 1 have NASDAQ as their attribute values in attribute "exchange". However, 12 bitmap vectors each are needed for the "trading volume" attribute and for the

TABLE 1

Selected stock trading data on 10/18/1995.

| Record ID | Ticker Symbol | Trading Volume | Closing Price | Exchange |
|---|---|---|---|---|
| 1 | AAPL | 4575000 | 36.625 | NASDAQ |
| 2 | ABF | 64200 | 24.500 | NYSE |
| 3 | AET | 369000 | 72.625 | NYSE |
| 4 | CPQ | 8968800 | 51.375 | NYSE |
| 5 | DEC | 4461100 | 49.750 | NYSE |
| 6 | DELL | 2714400 | 89.750 | NASDAQ |
| 7 | HWP | 3009300 | 90.250 | NYSE |
| 8 | IBM | 7657700 | 92.500 | NYSE |
| 9 | IFMX | 3493600 | 33.000 | NYSE |
| 10 | INTC | 17694400 | 65.500 | NASDAQ |
| 11 | LGNT | 2600 | 47.250 | NASDAQ |
| 12 | MSFT | 18288600 | 91.125 | NASDAQ |

"closing price" attribute because all 12 records have different values. Thus, a total of 26 bitmap vectors are needed.

Multidimensional bitmap indexing can be very effective if the indexed attributes are of low cardinality, such as the "exchange" attribute in Table 1 (the cardinality of an attribute is the number of distinct values of the attribute). However, for high cardinality attributes, storage requirements can become prohibitively large. If N is the total number of records to be indexed, m is the number of dimensions (attributes) to be included in the multidimensional index, and $D_i$ is the number of distinct values for attribute I, then the total storage requirement S for a multidimensional bitmap index, in bits is $$S = N \times \sum_{I=1}^{m} D_i.$$

If $\Sigma D_i$ is small, then S can still be manageable even if N is large. However, if both N and $\Sigma D_i$ are large, e.g., where some attributes may be of a continuous data type, then a huge amount of storage space may be needed to store all the bitmap vectors. For example, assume the stock data in Table 1 included the trading records of all listed NYSE, NASDAQ and AMEX stocks for each trading day of 1995. Clearly, in this case the storage required for a corresponding bitmap index would be extremely large because of the high cardinality of the "trading volume" and "closing price" attributes. The high storage requirements for high cardinality attributes can make multidimensional bitmap indexing very inefficient.

One possible approach to reducing the storage overhead due to high cardinality attributes is to partition the attribute values into a number of ranges. Here, a bitmap vector may be used to represent a range of attribute values, instead of a distinct value. This way, the number of bitmap vectors for any attribute can be properly controlled. The bitmap vector is set to a value of one if the attribute value of a record falls into the specified range; otherwise the bitmap vector is set to a zero. This range-based bitmap indexing, however, may require a longer query processing time to examine the details of all the records in the matched range. Nevertheless, it represents a potential good trade off for a reduced storage requirement.

Consider the example shown in Table 1, where a smaller number of range-based bitmap vectors are used to index the "trading volume" attribute, instead of the previous case which required twelve. Assuming the records are not pre-sorted, the range of "trading volume" attribute values could be partitioned into two ranges (also referred to as buckets). If we assume that the maximum trading volume is 20,000,000 shares, the ranges could be equally divided, let's say, [0, 10,000,000] and (10,000,001, 20,000,000]. The resulting bitmap vectors representing the two ranges for the "trading volume" attribute of Table 1 are as follows:

[10,000,001, 20,000,000]: (0 0 0 0 0 0 00 0 1 0 1).
[0,10,000,000]: (1 1 1 1 1 1 1 1 1 0 1 0);

Using these two range-based bitmap vectors for the "trading volume" attribute and the earlier discussed two bitmap vectors for the "exchange" attribute, we can still process a query such as, "find all NYSE traded stocks on Oct. 18, 1995 with trading volumes of less than 3 millions shares" in a fairly straightforward fashion. First, the bitmap vectors of NYSE: (0 1 1 1 1 0 1 1 1 0 0 0) and the relevant "trading volume" vector [0, 10,000,000): (1 1 1 1 1 1 1 1 1 0 1 0) are bitwise ANDed to produce (0 1 1 1 1 0 1 1 1 0 0 0). Then the trading volume attribute values of the seven records corresponding to the 1's ( Record IDs 2, 3, 4, 5, 7, 8, and 9) are individually examined to identify the records meeting the requirements. Here, records two and three satisfy the query.

A difficulty with such arbitrary partitioning is the varying search times that will result from such a non-uniform distribution of records to each bucket. In the previous example, we see that the [0, 10,000,000] range bitmap vector references 10 records while the [10,000,001, 20,000,000] range bitmap vector references only 2 records. The problem of uneven distribution is exacerbated further when the attribute values are highly skewed. Pre-sorting the data prior to building the bitmap indexes incurs high I/O costs, especially for external sorting of a large table.

Another variation on the arbitrary partition approach could be to select an arbitrary large number of ranges (buckets) as an initial value, and simply collect the bucket counts in each bucket during the initial scan. The larger the initial value selected the more effective such an approach becomes. In the absence of isolated skew values, tuples may be scanned only once and the bucket construction done simultaneously for all the attributes. However, if attribute values are highly skewed or if multiple attributes are to be partitioned simultaneously, the initial value must be extremely large in order to be effective. As the initial value increases so does the storage requirements, making this method less desirable where multiple attributes are to be partitioned simultaneously, or if there are isolated skew values that appear repeatedly. The present invention addresses the problem of isolated skew values.

After bucket expansion, there will be an excess of ranges (buckets) and the distribution of attribute values therein may be uneven. The prior art discloses a method of combining non-contiguous buckets, i.e., after bucket expansion is complete, into a smaller number of buckets having an approximately balanced distribution. If non-contiguous buckets can be combined, then the bucket contraction problem is similar to the so-called minimum makespan or multiprocessor scheduling problem. It is known to be NP-complete and an LPT (least processing time first) heuristic has been proposed for the problem (see R. Graham, "Bounds for Certain Multiprocessing Anomalies," *Bell System Technical Journal*, vol. 45, pp. 1563—1581 (1966). Combining any (non-contiguous) two buckets may be acceptable for certain attributes that do not have range semantics and do not support range queries, such as department numbers in a personnel database or part numbers in an inventory database. However, for most high-cardinality attributes that have range semantics and support range queries, only contiguous buckets can be combined. The present invention addresses such a need.

Note that the prior art discusses bucket partitioning in the hash-part-titioned join algorithms, such as the GRACE hash-join and Hybrid hash-join algorithms. See, e.g., D. J. DeWitt and R. Gerber, Multiprocessor Hash-based Join Algorithms, in *Proc. of Very Large Databases* pp. 151–164 (1985). See also: M. Kitsegura, M. Nakayama, and M. Takagi, The Effect of Bucket Size Tuning in the Dynamic Hybrid GRACE Hash Join method, in *Proc. of Very Large Databases* pp. 257–266 (1990); M. Nakayama, M. Kitsegura, and M. Takagi, Hash-Partitioned Join Method Using Dynamic destaging strategy, in *Proc. of Very Large Databases* pp. 468–478 (1988); and L.D. Shapiro, Join Processing in Database Systems with Large Main Memories, it ACM Trans. On Database Systems, 11(3):239–264 (Sept. 1986). In both cases, a relation is partitioned into multiple buckets based on the values of a particular attribute. However, their constraints and objectives are distinctly different. In the hashpartitioned join algorithms, the goal is to hash a relation R into non-contiguous buckets such that each bucket can be stored into main memory to build a hash table for joint operations with another relation S. Here, the "range" of a bucket is not important, and thus a tuple can be arbitrarily hashed into any bucket. Bucket tuning can therefore be used to combine any number of small buckets into a larger one so long as the resultant bucket can be fit into main memory. In a ranged-based multidimensional bitmap index which is the subject of the present invention, however, the "range" of a bucket is important information. Tuples cannot be hashed into any bucket. In order to support range queries, only contiguously ranged small buckets can be combined in bucket contraction. Moreover, the bucket size should be flexible. The present invention addresses such a need.

The prior art also discusses the concept of counting object occurrences to identify hot spots in databases and file systems. See e.g., S. Akyurek and K. Salem, Adaptive Block Rearrangement, in *Proc. of Int. Conf. On Data Engineering*, pp. 182–189 (1993). See also, K. Salem, D. Barbara, and R.J. Lipton, Probabilistic Diagnosis of Hot Spots, in *Proc. of Int. Conf. On Data Engineering*, pp. 30–39 (1992). However, unlike hot spot identification, the objective of occurrence counting in the context of bucket partitions for bitmap indexes is to ensure that the attribute values are equally partitioned. The present invention addresses such a need.

Thus, there is a need for a method of building a range-based multidimensional bitmap index data structure for accessing a database having high cardinality and skewed attribute values. Preferably, the range-based multidimensional bitmap index data structure provides balanced multipredicate query processing time without requiring pre-sorting of the database. The present invention addresses such a need.

SUMMARY OF THE INVENTION

The present invention is addressed to the aforementioned needs for a computerized method of building balanced ranges (also called partitions or buckets) of attribute values for multiple attributes of a database simultaneously. Presorting of the database is not required. The balanced ranges are used to construct balanced range-based multidimensional bitmap indexes for processing complex multipredicate queries against the database. In a preferred embodiment, a dynamic partition expansion and contraction method can construct balanced partitions for bitmap indexing of tuples having high cardinality attributes and even in the presence of highly skewed data.

A computerized method of constructing balanced multidimensional range-based bitmaps having features of the present invention comprises the steps of: partitioning each attribute in the database into partitions spanning contiguous ranges of attribute values, each partition having an occurrence count; sequentially scanning each tuple in the database and incrementing the occurrence count of a partition associated with an attribute value of each of the attributes; and, when all the tuples have been scanned once, combining the partitions and balancing the occurrence count across the combined partitions. Preferably, the computerized method includes the steps of: constructing balanced range-based bitmap indices according to the ranges of attribute values of the combined partitions; and storing the balanced range-based bitmap index data structure in a computer readable memory such as a disk.

In another preferred embodiment the computerized method includes a dynamic partition expansion method, further comprising the step of splitting the partition into a plurality of partitions when the occurrence count exceeds a threshold, responsive to the step of incrementing the occurrence count. Yet another preferred embodiment includes the step of dynamically adjusting the threshold as a function of a percentage of the database that has been scanned.

In still another preferred embodiment, the step of sequentially scanning each tuple includes the steps of: determining when the attribute value is an isolated skew value; creating a special partition associated with the isolated skew value; and incrementing the occurrence count associated with the special partition. Preferably, when the occurrence count exceeds a threshold, the partition may be split into a plurality of partitions. A preferred embodiment uses a two-stack method for determining when the attribute value is an isolated skew value wherein a primary stack is prioritized by recency of occurrence and a secondary stack prioritized by frequency of occurrence.

BRIEF DESCRIPTION OF THE DRAWINGS

These and other features, aspects, and advantages of the present invention will become better understood with regard to the following description, appended claims, and accompanying drawings wherein:

FIGS. 3, 3A–3B show an embodiment of a computer-implemented method for dynamically constructing range-based multidimensional bitmap indexes according to the present invention;

DETAILED DESCRIPTION OF A PREFERRED EMBODIMENT

Figure 1:
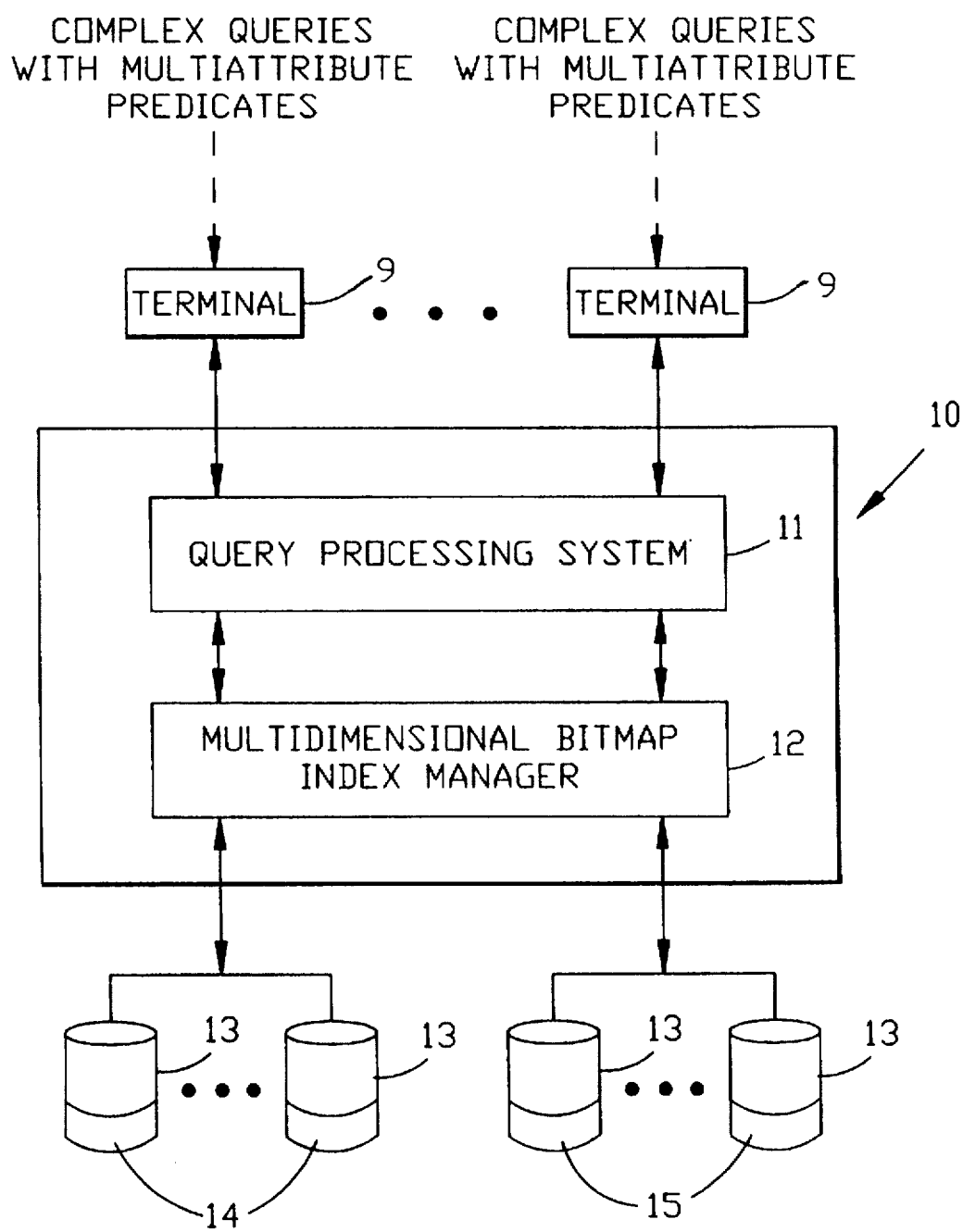
FIG. 1 shows an embodiment of a computer database system capable of supporting multidimensional data analysis using range-based multidimensional bitmap indexes according to the present invention.

FIG. 1 is a block diagram of an embodiment of a computer system according to the present invention capable of uniformly processing complex database queries using range-based multidimensional bitmap indexes 14. The system includes a large database 15 of unsorted records (also referred to herein as tuples) having high cardinality attribute values. The database 15 may include unevenly distributed and highly skewed data. The computer system includes a query processing system 11 which processes complex queries including multiattribute predicates which may be submitted through terminal(s) 9 coupled to the database management system 10. Such a database management system is well known in the art, such as the product sold by IBM Corp. under the trademark "DB2." Those skilled in the art will appreciate that the database management system 10 may reside in a local memory of each terminal 9 or in a remote memory accessible, e.g., through a local area network (LAN) and/or wide area network (WAN). The terminal(s) 9 and database management system 10 can be implemented on many hardware platforms, such as a single processor sold by IBM Corp. under the trademark "RS6000" or a multiprocessor system sold by the IBM Corp. under the trademark The database management system 10 includes a multidimensional bitmap manager 12 according to the present invention. The multidimensional bitmap manager 12 constructs range-based multidimensional bitmap indexes 14 which reference database 15. An embodiment of a multidimensional bitmap manager 12 for constructing the range-based multidimensional bitmap indexes 14 according to the present invention will be described with reference to FIG. 3. Referring again to FIG. 1, the multidimensional bitmap indexes 14, are preferably used by the query processing system 11 to retrieve qualified database records from database 15 stored on disks 13. Those skilled in the art will appreciate that indexes 14 and database 15 which for clarity are shown on separate disks 13, could be located on the same disks. Those skilled in the art will also appreciate that the problem of partitioning tuples of a database based on the values of an attribute so that each partition is assigned to a separate processor in a parallel database system is similar to the problem of range-based bitmap indexing for a single attribute. Thus, range-based multidimensional bitmap indexing can also be applied to range-based partitioning for query processing in a parallel database system, within the spirit and scope of the present invention.

Figure 2:
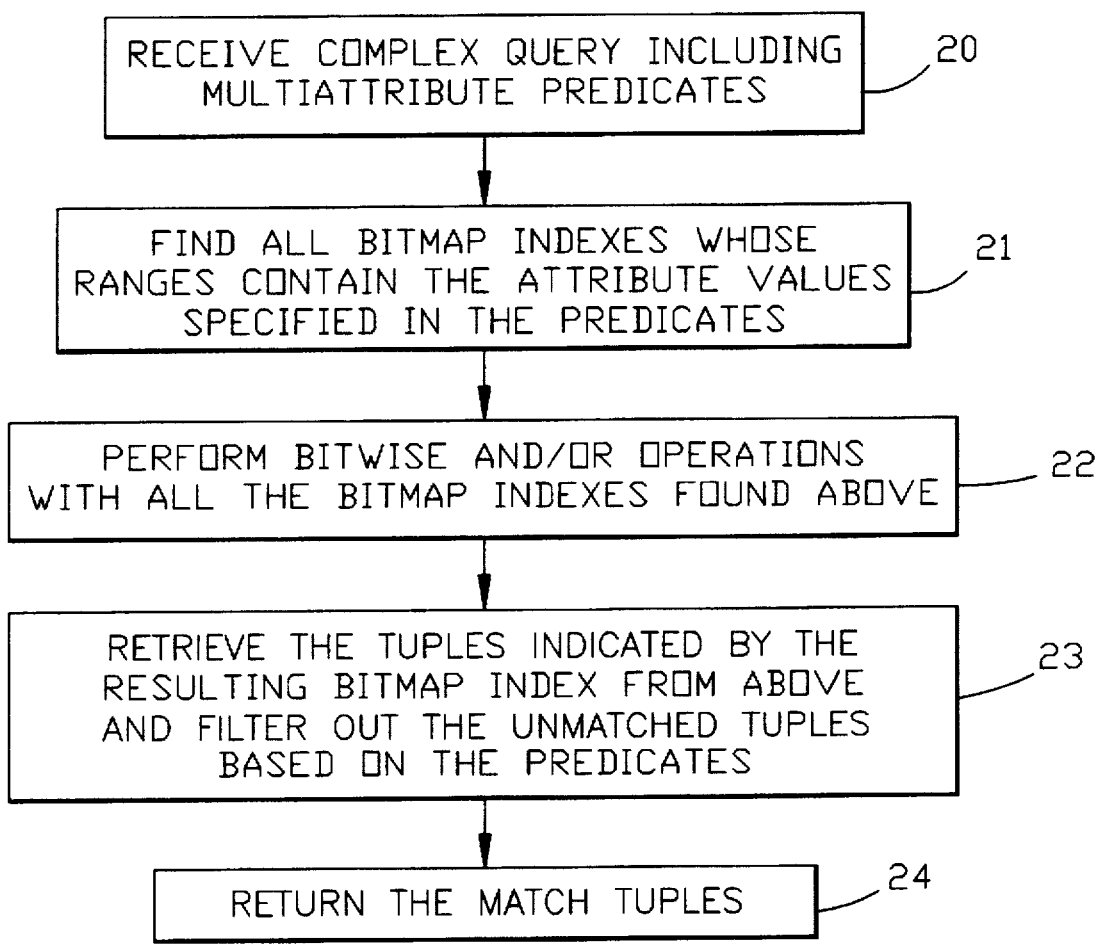
FIG. 2 shows an embodiment of a computer-implemented method according to the present invention for processing a multiattribute query using range-based multidimensional bitmap indexes.

FIG. 2 shows an embodiment of a computer-implemented method according to the present invention for processing a multiattribute query using range-based multidimensional bitmap indexes 14. In step 20, a complex query including multiattribute predicates is communicated from one of the terminals 9 to the query processing system 11. In step 21, based on the attribute values specified in the predicates, the query processing system uses the multidimensional bitmap index manager 12 of the present invention to identify and retrieve the corresponding range-based bitmap indexes 14 stored on disks 13. In step 22, bitwise AND/OR operations are performed on the retrieved bitmap indexes. In step 23, the tuples corresponding to the one's in the resulting bitmap index from step 22 are retrieved from the database 15. Those tuples whose attribute values do not match the attribute values specified in the predicates are filtered out. Finally, in step 24, the tuples retrieved in step 23 which satisfy the complex query are returned to the requesting terminal 9.

Figure 3A:
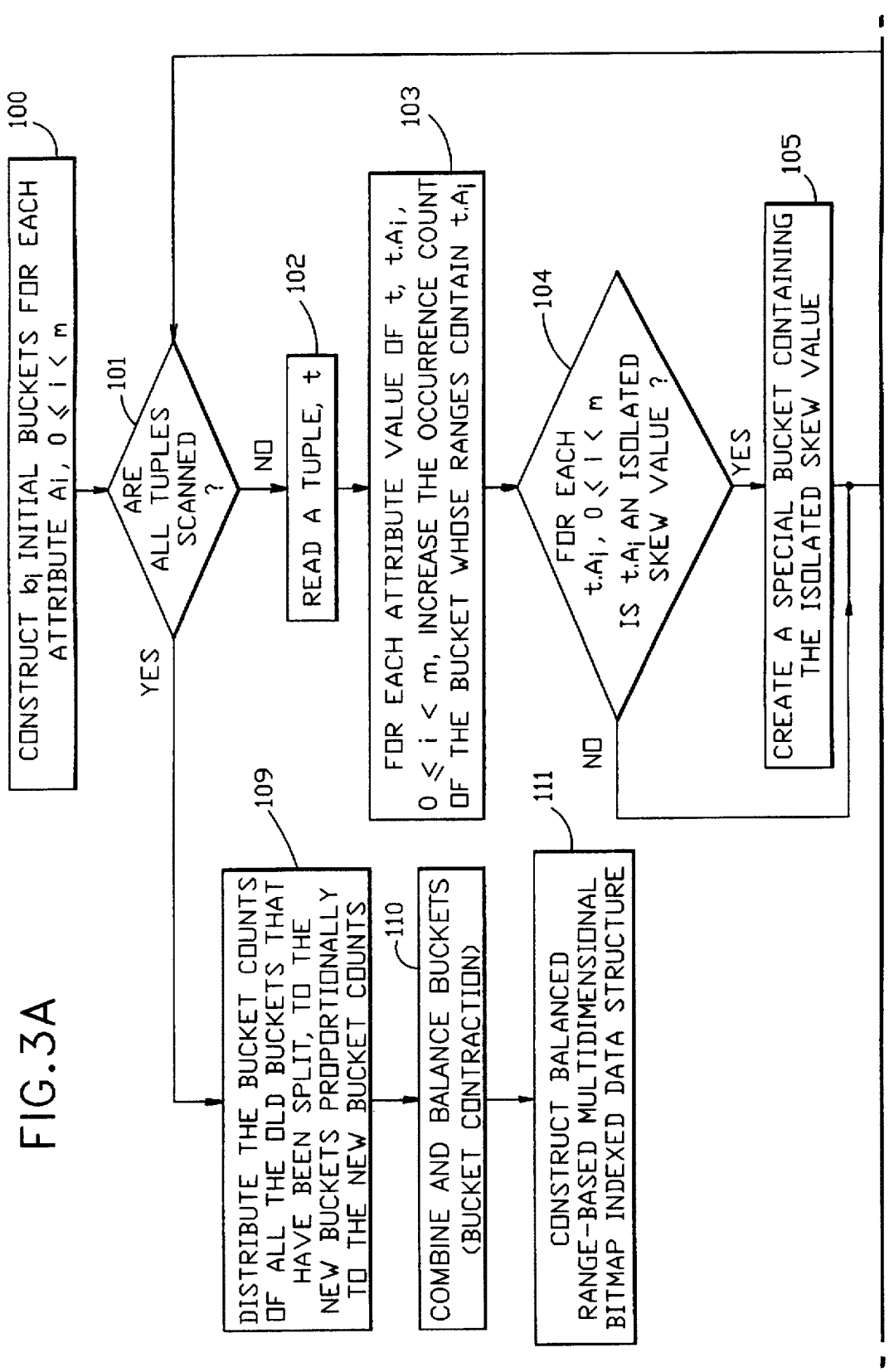

Referring now to FIG. 3, a method is shown for constructing range-based multidimensional bitmap indexes 14 according to the present invention. By way of overview, assume that we want to construct range-based multidimensional bitmap indexes 14 for a database 15 having m attributes, $A_0, A_1, \ldots, AK_{m-1}$, and the final number of bitmap indexes (or buckets) for each attribute is $B_i$, $0 \leq i < m$. Assume that the distribution of attribute values in the database is of high cardinality, is not uniform and tends to be skewed to certain ranges. Assume also that the data in database 15 has not been pre-sorted.

According to an embodiment of the present invention, a bucket expansion and contraction method constructs buckets approximately as a function of the attribute value distribution in the data records. A preferred embodiment comprises a two-phase sequential I/O scan approach. The overall idea of the bucket expansion and contraction method is to use many more smaller buckets for each attribute to count the number of tuples falling to each bucket and then combine the smaller-range buckets into the final buckets $B_i$.

In a preferred embodiment, a dynamic bucket construction method is shown wherein isolated skew values are identified and allocated a separate bucket. After the buckets are constructed, a second database scan is performed and the range-based multidimensional bitmap indexes 14 are built based on the ranges of the final buckets.

Table 2 illustrates pseudo-code for a dynamic bucket expansion logic according to the present invention. For each tuple t, we find the bucket b[j] such that a[i] falls into the range of b[j] and increase its record count. If needed, a bucket may be dynamically expanded into more smaller-range buckets. The criterion for expansion is a bucket count exceeding a threshold, T. The checking of the threshold can be periodic or whenever a bucket count is updated. Since some of the buckets may be newly expanded, the threshold for triggering a further expansion of a small-range bucket should take into consideration the age of the bucket since its creation. After every tuple is scanned, the original record counts of all the expanded buckets are redistributed into the smaller-range buckets in proportion to the respective counts of the smaller-range buckets.

Referring now to FIG. 3, a method is shown for dynamically constructing range-based multidimensional bitmap indexes 14 according to the present invention. In step 100, let the final number of buckets for attribute $A_i$ be $B_i$, and the bucket expansion method begins with $b_i$ initial buckets for attribute $A_i$, where $b_i > B_i$ and $0 \leq i < m$. Note that $b_i$ can be any number without affecting the outcome of the expansion method since a bucket may be expanded dynamically once the bucket count exceeds a predetermined threshold. In step 101, it is determined whether all the tuples to be indexed have been scanned once. In step 102, each tuple t is retrieved one at a time from database 15 and processed. In step 103, For each attribute value of t, t.$A_i$, we find the bucket whose ranges contain t.$A_i$ and increment its bucket count by one.

Recall that since bucket expansion alone cannot deal with isolated skew values, a method (such as will be discussed with reference to FIG. 4) is needed to detect if a given attribute value is an isolated skew value during the bucket expansion process. In step 104, isolated skew values are identified. If the attribute value is not an isolated skew value then step 106 is performed. In step 105, identified isolated skew values may be allocated to a special bucket. In step 106, a check is made to determine whether the tuple being processed is some multiple of p% of the tuples scanned. If the tuple being processed is some multiple of p% of the tuples scanned, then step 107 is performed. Otherwise, the process repeats again at step 101. In step 107, all buckets (other than those "special buckets" containing isolated skew values) having a bucket count exceeding a predetermined threshold T are identified. If none are identified then the process repeats again at step 101. Note that threshold T needs to be adjusted according to the age of the bucket since its creation. For example, if a new bucket was created after 10% of the data were scanned, the threshold for this bucket at the time when 20% of the data were scanned is 10%×T. In step 108, all buckets identified in step 107 may be split into a greater number of smaller-range buckets while maintaining the old bucket counts and ranges. Returning to step 101, after all the tuples have been scanned, step 109 is performed. In step 109, the bucket counts for the old buckets that have since been expanded are distributed to the split buckets (from step 108) in proportion to the new bucket counts. Note that the set of buckets will be greater than the target number $B_i$. In step 110, the buckets from step 109 may be combined and balanced (also referred to as bucket contraction). The resulting balanced ranges may be stored in a stable computer readable storage such as disks 13 for subsequent generation of the multidimensional bitmap indexes.

Note also that the prior identification of the isolated skew values can benefit the bucket contraction logic and yield a lower standard deviation in the final output. For example, identified isolated skew values may be separated, thus allowing the bucket contraction logic to concentrate on combining and balancing the remaining small-range buckets. Thus, storage costs are reduced and subsequent multi-predicate queries exhibit uniform processing time across the final multidimensional bitmap indexes. An embodiment of a bucket contraction method according to the present invention will be discussed with reference to FIG. 5. Referring again to FIG. 3, in step 111 the final balanced ranges are used to construct the range-based bitmap indexes, which may be stored on disks 13.

TABLE 2

| Pseudo code for dynamic bucket expansion. |
|---|
| (1) for every tuple t |
| (2) { |
| (3)   find bucket b[j] such that |
|     a[i] falls into b[j] and increase its record count; |
| (4)   push a[i] into the primary stack; |
| (5)   push a[i] into the secondary stack; |
| (6)   if bucket counts need to be checked for expansion |
| (7)   { |
| (8)     find all the buckets that need to be expanded; |
| (9)     for each bucket b[k] to be expanded; |
| (10)     { |
| (11)       if there is an isolated skew value in b[k] |
| (12)       allocate a separate bucket for it and adjust neighboring buckets; |
| (13)     else |
| (14)       expand b[k] into more smaller-range buckets; |
| (15)       maintain the count and range of b[k] ; |
| (16)     } |
| (17)   } |
| (18) } |
| (19) re-distribute the occurrence counts of all the expanded buckets; |

Those skilled in the art will appreciate that alternatively, bucket construction for high cardinality attributes can be piggybacked with the bitmap vector construction of other low cardinality attributes. Thus, no additional I/O overhead may be incurred for the first phase. This is particularly true if multiple passes are needed to build the complete bitmap vectors, e.g., where many attributes are to be included in the multidimensional bitmap indexes. In any case, the collection of occurrence counts by range for all high cardinality attributes can be advantageously done in a single scan. In contrast, if the database is pre-sorted to collect the distribution of attribute values, each high cardinality attribute has to be sorted separately, incurring substantially higher I/O costs.

Figure 4:
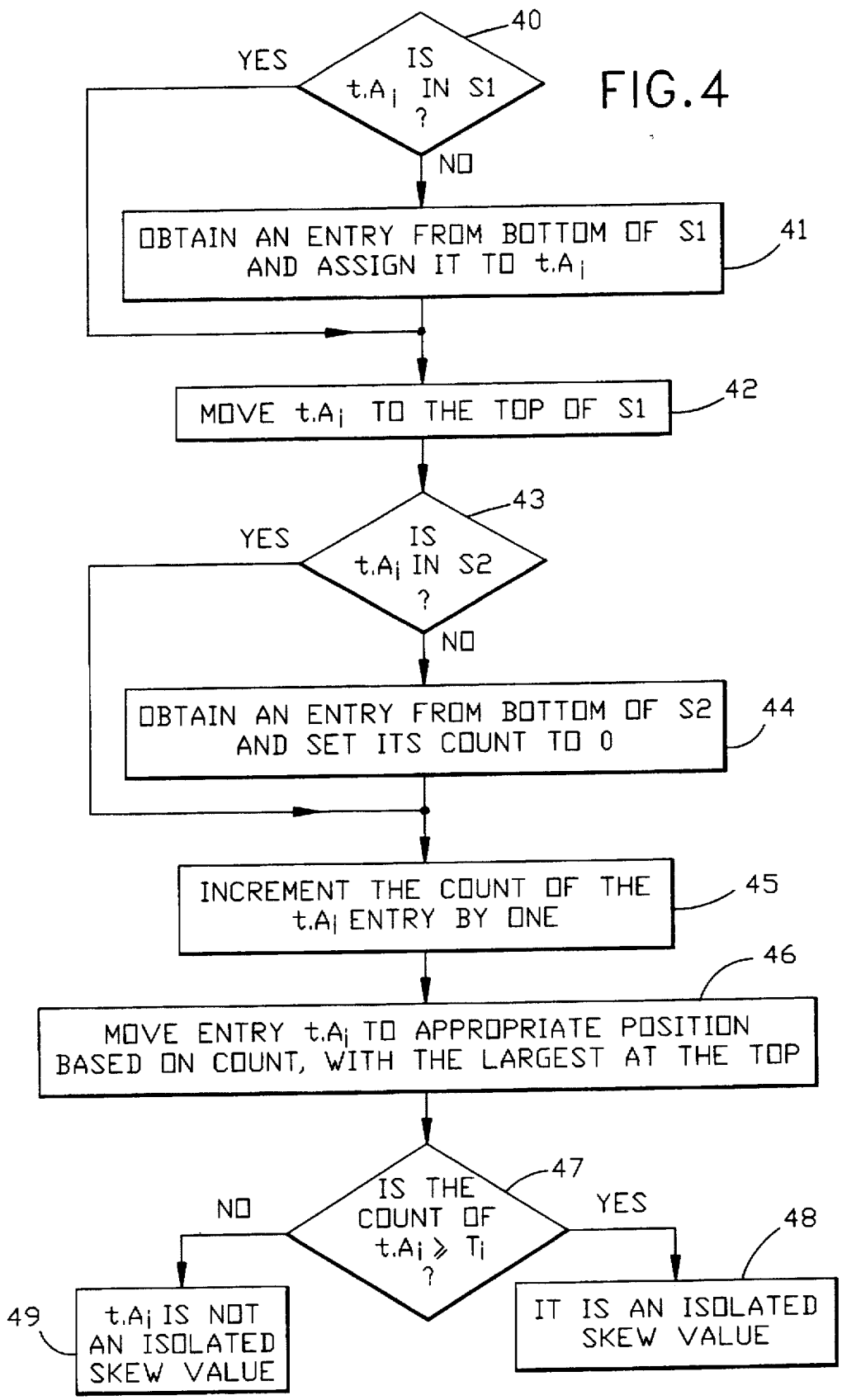
FIG. 4 shows an embodiment of a computer-implemented method for processing the isolated skew values referenced in FIG. 3.

FIG. 4 shows a computer-implemented method according the present invention for identifying isolated skew values (step 104 of FIG. 3) and allocating special buckets therefor (step 105 of FIG. 3). If not identified, repeated isolated skew values can result in a large number of unneeded expansions which waste memory space. In addition to reducing unnecessary bucket expansions, bucket contraction can also be better accomplished after isolated skew values are identified. Knowing the sizes of the isolated skew values, we can allocate a separate final bucket for each of them and focus on combining the remaining smaller buckets.

By way of overview, in a preferred embodiment two stacks can be maintained to identify any isolated skew values. A primary stack may be prioritized by the recency of occurrence, while a secondary stack is maintained by the frequency of occurrence. For example, the attribute value with the highest occurrence count is pushed on the top of the secondary stack, and the bottom of the stack gets flushed out first. As each record is processed, its attribute value will be added or moved to the top of the primary stack, similar to a conventional least recently used (LRU) stack. It will also be added to the secondary stack, if not yet there, and the occurrence count of the secondary stack is incremented. Thus, the primary stack identifies attribute values that are repeated reasonably recently, while the secondary stack tracks the occurrence counts for those values. The secondary stack will stop considering those attribute values whose occurrence counts do not increase fast enough. This way, the storage requirements of the two stacks can be advantageously controlled and further avoid tracking every possible attribute value. As a result, in this embodiment, we first check if a bucket contains some high occurrence attribute values in the secondary stack before a bucket is expanded. If a sizable fraction of a bucket count is due to a high occurrence attribute, e.g., it is a repeated skew value, a single bucket is assigned to this attribute value. Preferably, This single value bucket will not be split any further no matter how large the occurrence count grows. The sizes of both stacks can be as small as the number of final buckets for each attribute. Note that although the method of FIG. 4 is applied to a single attribute value, it is preferably done for each attribute value (from step 103 of FIG. 3).

Figure 5:
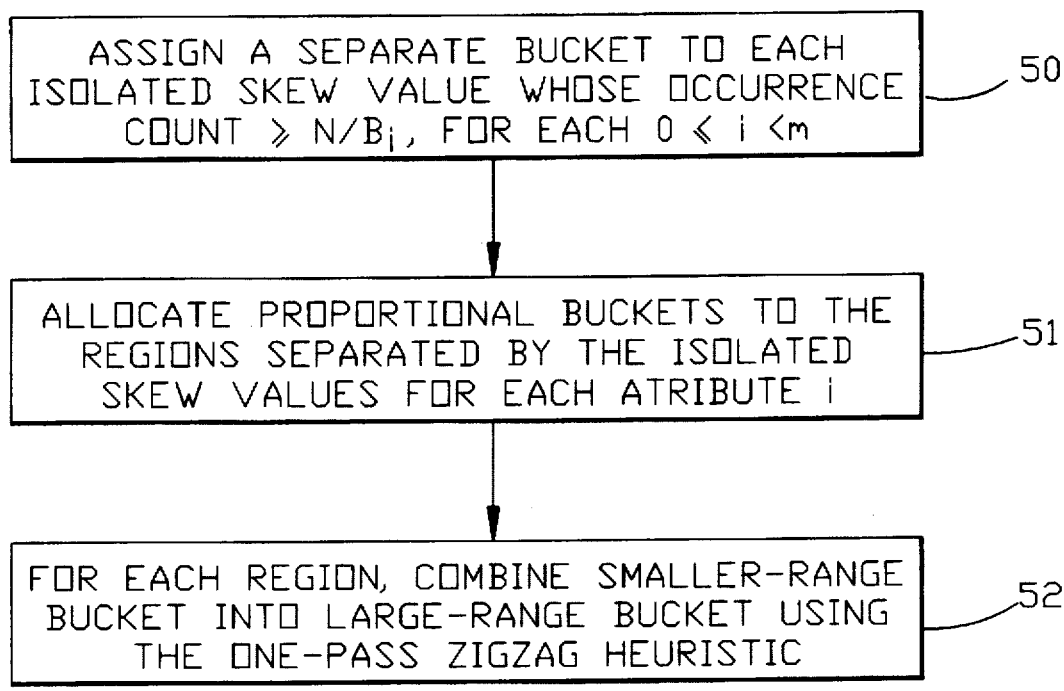
FIG. 5 shows an embodiment of a computer-implemented method according to the present invention for combining and balancing range-based multidimensional bitmap indexes (bucket contraction) referenced in FIG. 3.

Referring specifically now to FIG. 4, a stack Si employs a least recently used (LRU) replacement policy, i.e., the least recently used entry is replaced first. Stack S2 uses the occurrence count as the replacement criteria, i.e., the entry with the smallest count is replaced first. As a result, the most recently referenced attribute value is placed at the top of SI and the entry with the largest count is placed at the top of S2. Replacement is always from the bottom of each stack. Thus, if an isolated value does not appear with sufficient frequency repeatedly and is pushed out of stack SI, it may still be captured by stack S2 (as a function of its count). In step 40, first examine whether the attribute value $t.A_i$ already exists in stack S1. If yes, in step 42 we simply move this entry to the top of stack SI. Otherwise, in step 41, the bottom entry of S1 is replaced with $t.A_i$, and the new entry is moved to the top of S1, as in step 42. In step 43, $t.A_i$ is compared against the values in S2, as in 43. If $t.A_i$ is not found in S2, in step 44, the bottom of S2 is replaced with it. Otherwise, in step 45, the occurrence count of the existing entry for $t.A_i$ in S2 is incremented by one. In step 46, the $t.A_i$ entry is moved to an appropriate position in S2 based on the occurrence count. The entry with the largest count is at the top of the stack while the one with the smallest count is at the bottom. In step 47, the occurrence count is compared to a predetermined threshold Ti. In step 48, the attribute value $t.A_i$ is identified as an isolated skew value when its occurrence count exceeds the predetermined threshold $T_i$. Otherwise, in step 48, it is not so identified. In general, the threshold $T_i$ also needs to be adjusted according to the amount of tuples scanned so far. For example, at the time when 20% of the data were scanned, the threshold is $20\% \times T_i$. FIG. 5 shows an embodiment of a computer-implemented method according to the present invention for combining and balancing range-based multidimensional bitmap indexes (bucket contraction) referenced in FIG. 3. Recall that this embodiment of the present invention addresses the case of high-cardinality attributes having range semantics and which support range queries, i.e., where only contiguous buckets can be combined. In step 50, a separate bucket is assigned to represent each isolated skew value (from steps 104 and 105 of FIG. 3) whose occurrence count exceeds the ideal mean, $N/B_i$, for $0 \leq i < m$. Thus, the remaining smallrange buckets are advantageously separated into independent contiguous regions. Buckets in each independent contiguous region can be individually combined. In step 51, the number of buckets allocated for each region can be proportional to the total number of tuples falling into the region. In step 52, once the number of final buckets for each region are determined, a one-pass zigzag heuristic (described with reference to FIG. 6) may be used to combine the small-range buckets into large buckets.

Figure 6:
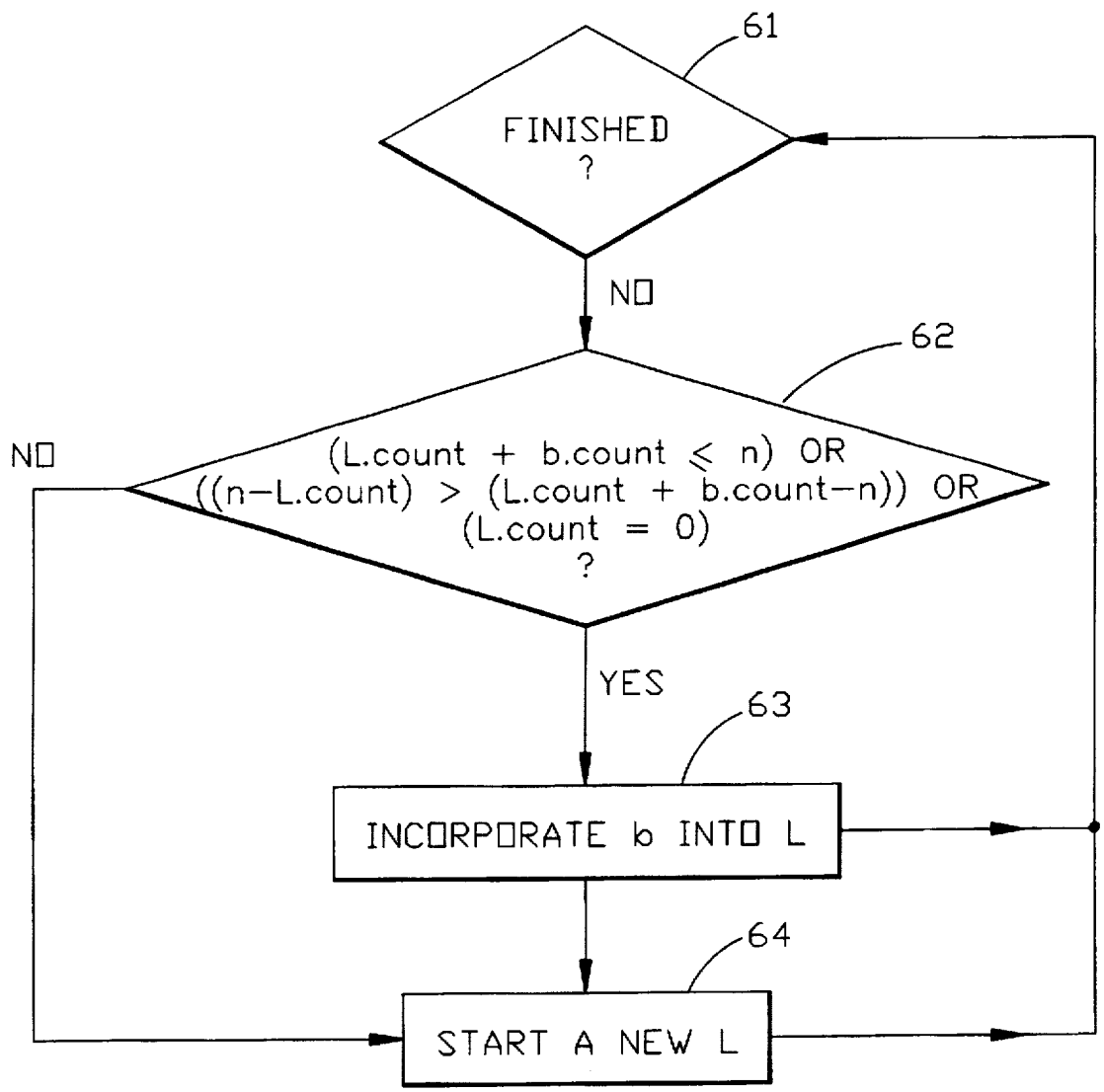
FIG. 6 shows an embodiment of a computer-implemented method according to the present invention for the one-pass heuristic for bucket contraction referenced in FIG. 3.

FIG. 6 shows an embodiment of a computer-implemented method according to the present invention for the one-pass heuristic for combining the small-range buckets (bucket contraction) of a given region into large-range buckets. According to one embodiment, assume that all the small-range buckets are to be combined into F large-range buckets. In step 62, the heuristic starts with an empty large-range bucket and incorporates the next small-range bucket into it, if possible. Assume L represents the current large-range bucket and L.count represents the tuple count of L; b represents the next small-range bucket and b.count represents the tuple count of b. If n is ideal mean number of tuples for each final large-range bucket, then satisfying any one of three conditions may allow b to be incorporated into L. The first condition is, if after incorporating b, the total tuple count in L is still less than n. The second condition is, if after incorporating b, the excess of the tuple count of the resultant large-range bucket over n is less than the deficit if b is not incorporated. The third condition is that if L is still empty. In step 63, if any of the three conditions are true, then b may be incorporated into L; otherwise, a new L is started, in step 64. In step 61, the contraction process ends when all the small-range buckets are combined into the F (or less) large-range buckets.

Note that the above embodiment of the one-pass zigzag contraction heuristic assumes that the fraction of tuples in each final bucket is to be balanced. In an alternative embodiment, if there are no isolated skew values, the fractions of tuples in the final buckets can be any specified distribution. To achieve that, the one-pass zigzag heuristic can be modified within the scope of the present invention as follows. Instead of using the ideal mean number of tuples n in two of the three conditions for including the next small-range bucket to the current large-range bucket, we can use a specific number for each large-range bucket based on a pre-specified distribution. For example, assume that we are to use five bitmap indexes for an attribute and the fractions of tuples in the five buckets are 10%, 10%, 20%, 30%, and 30%, respectively. Then the specific number to replace n in FIG. 6 is 10%×N for the first and second large-range buckets, 20%×N for the third bucket, and 30%×N for the last two buckets.

Now that the invention has been described by way of a preferred embodiment, various modifications and improvements will occur to those of skill in the art. Thus, it should be understood that the preferred embodiment has been provided as an example and not as a limitation. The scope of the invention is defined by the appended claims.

We claim:

1. A computerized method of constructing balanced multidimensional range-based bitmap indices associated with a database which includes a plurality of tuples, each tuple having a plurality of attributes, said method comprising the steps of:

partitioning each attribute in the database into partitions spanning contiguous ranges of attribute values, each partition having an occurrence count;

sequentially scanning each tuple in the database and incrementing the occurrence count of a partition associated with an attribute value of each of said attributes; and when all tuples have been scanned once, combining partitions and balancing the occurrence count across combined partitions.

2. A computerized method as claimed in claim 1, further comprising the steps of: constructing the balanced range-based bitmap indices according to the ranges of attribute values of the combined partitions; and storing the balanced range-based bitmap indices on a computer readable memory.

3. A computerized method as claimed in claim 1, further comprising the step of splitting the partition into a plurality of partitions when the occurrence count exceeds a threshold, responsive to said step of incrementing the occurrence count.

4. A computerized method as claimed in claim 3, further comprising the step of dynamically adjusting the threshold as a function of a percentage of the database that has been scanned.

5. A computerized method as claimed in claim 1, wherein said step of sequentially scanning each tuple further comprises the steps of:

determining when the attribute value is an isolated skew value;

creating a special partition associated with said isolated skew value; and incrementing the occurrence count associated with the special partition.

6. A computerized method for processing a multiattribute query using the balanced range based bitmap indices constructed according to the method of claim 2, comprising the steps of:

receiving a query including multiattribute predicates, retrieving corresponding range-based bitmap indexes based on the attribute values specified in the predicates;

performing bitwise AND/OR operations on retrieved bitmap indexes;

retrieving the tuples corresponding to the one's in the resulting bitmap index in response to the bitwise AND/OR operations; and filtering out all tuples having attribute values that do not match the attribute values specified in the predicates.

7. A computerized method as claimed in claim 5, wherein said step of determining when the attribute value is said isolated skew value further comprises the steps of:

maintaining a primary stack prioritized by recency of occurrence and a secondary stack prioritized by frequency of occurrence;

searching the primary stack for a primary entry matching the attribute value and performing the following steps:

when the primary entry is found, moving the primary entry to the top of the primary stack;

when the primary entry is not found, obtaining a bottom primary entry from the bottom of the primary stack and associating the attribute value therewith, and moving the bottom primary entry to the top of the primary stack;

searching the secondary stack for a secondary entry matching the attribute value and performing the following steps:

when the secondary entry is found, incrementing a count associated with the secondary entry and moving the secondary entry to a location according to the count;

when the secondary entry is not found, associating the attribute value with a bottom secondary entry and initializing the count; and identifying the attribute value as said isolated skew value when the count exceeds a skew threshold.

8. A computerized method as claimed in claim 7, further comprising the step of dynamically adjusting the skew threshold as a function of a percentage of the database that has been scanned.

9. A computerized method as claimed in claim 5 wherein said step of combining partitions and balancing the occurrence count across the combined partitions comprises the steps of:

assigning a separate partition for each isolated skew value as a function of the occurrence count exceeding an ideal mean;

allocating proportional partitions to each contiguous range of values bounded by the separate partition, responsive to said step of assigning; and combining and balancing said each contiguous range of values into the proportional partitions.

10. A computerized method as claimed in claim 5 wherein said step of combining and balancing said each contiguous range of values into the proportional partitions comprises a one-pass zigzag heuristic.

11. A computerized method as claimed in claim 1, further comprising the step of pre-specifying a distribution of tuples in each partition.

12. A computerized method of constructing balanced multidimensional range-based bitmap indices associated with a database which includes a plurality of tuples, each tuple having a plurality of attributes, said method comprising the steps of:

partitioning each attribute in the database into partitions spanning contiguous ranges of attribute values, each partition having an occurrence count;

sequentially scanning each tuple in the database and incrementing the occurrence count of a partition associated with an attribute value of each of said attributes;

determining when the attribute value is an isolated skew value;

creating a special partition associated with said isolated skew value;

incrementing the occurrence count associated with the special partition;

splitting the partition into a plurality of partitions when the occurrence count exceeds a threshold, responsive to said step of incrementing the occurrence count;

dynamically adjusting the threshold as a function of a percentage of the database that has been scanned;

when all tuples have been scanned once, combining partitions and balancing the occurrence count across combined partitions;

constructing the balanced range-based bitmap indices according to the ranges of attribute values of the combined partitions, responsive to said steps of combining partitions and balancing; and storing the balanced range-based bitmap indices on a computer readable memory, responsive to said step of constructing the balanced range-based bitmap indices.

13. A computer storage device readable by a computer, tangibly embodying a multidimensional range-based bitmap indexed data structure as created by the method steps claimed in claim 2.

14. A program storage device readable by a computer, tangibly embodying a program of instructions executable by the computer to perform a computerized method of constructing balanced range-based bitmap indices associated with a database which includes a plurality of tuples, each tuple having a plurality of attributes, said method comprising the steps of:

partitioning each attribute in the database into partitions spanning contiguous ranges of attribute values, each partition having an occurrence count;

sequentially scanning each tuple in the database and incrementing the occurrence count of a partition associated with an attribute value of each of said attributes; and when all tuples have been scanned once, combining partitions and balancing the occurrence count across combined partitions.

15. A program storage device readable by a computer, tangibly embodying a program of instructions executable by the computer to perform method steps as claimed in claim 14, further comprising the steps of:

constructing the balanced range-based bitmap indices according to the ranges of attribute values of the combined partitions; and storing the balanced range-based bitmap indices on a computer readable memory.

16. A program storage device readable by a computer, tangibly embodying a program of instructions executable by the computer to perform method steps as claimed in claim 14, further comprising the step of splitting the partition into a plurality of partitions when the occurrence count exceeds a threshold, responsive to said step of incrementing the occurrence count.

17. A program storage device readable by a computer, tangibly embodying a program of instructions executable by the computer to perform method steps as claimed in claim 16, further comprising the step of dynamically adjusting the threshold as a function of a percentage of the database that has been scanned.

18. A program storage device readable by a computer, tangibly embodying a program of instructions executable by the computer to perform method steps as claimed in claim 14, wherein said step of sequentially scanning each tuple further comprises the steps of:

determining when the attribute value is an isolated skew value;

creating a special partition associated with said isolated skew value; and incrementing the occurrence count associated with the special partition.

19. A program storage device readable by a computer, tangibly embodying a program of instructions executable by the computer to perform method steps as claimed in claim 18, further comprising the step of splitting the partition into a plurality of partitions when the occurrence count exceeds a threshold, responsive to said step of incrementing the occurrence count.

20. A program storage device readable by a computer, tangibly embodying a program of instructions executable by the computer to perform method steps as claimed in claim 18, wherein said step of determining when the attribute value is said isolated skew value further comprises the steps of:

maintaining a primary stack prioritized by recency of occurrence and a secondary stack prioritized by frequency of occurrence;

searching the primary stack for a primary entry matching the attribute value and performing the following steps:
when the primary entry is found, moving the primary entry to the top of the primary stack;
when the primary entry is not found, obtaining a bottom primary entry from the bottom of the primary stack and associating the attribute value therewith, and moving the bottom primary entry to the top of the primary stack;

searching the secondary stack for a secondary entry matching the attribute value and performing the following steps:
when the secondary entry is found, incrementing a count associated with the secondary entry and moving the secondary entry to a location according to the count;
when the secondary entry is not found, associating the attribute value with a bottom secondary entry and initializing the count; and identifying the attribute value as said isolated skew value when the count exceeds a skew threshold.

21. A program storage device readable by a computer, tangibly embodying a program of instructions executable by the computer to perform method steps as claimed in claim 20, further comprising the step of dynamically adjusting the skew threshold as a function of a percentage of the database that has been scanned.

22. A program storage device readable by a computer, tangibly embodying a program of instructions executable by the computer to perform method steps as claimed in claim 18 wherein said step of combining partitions and balancing the occurrence count across the combined partitions comprises the steps of:

assigning a separate partition for each isolated skew value as a function of the occurrence count exceeding an ideal mean;

allocating proportional partitions to each contiguous range of values bounded by the separate partition, responsive to said step of assigning; and combining and balancing said each contiguous range of values into the proportional partitions.

23. A program storage device readable by a computer, tangibly embodying a program of instructions executable by the computer to perform method steps as claimed in claim 18 wherein said step of combining and balancing said each contiguous range of values into the proportional partitions comprises a one-pass zigzag heuristic.

24. A program storage device readable by a computer, tangibly embodying a program of instructions executable by the computer to construct balanced range-based bitmap indices associated with a database which includes a plurality of tuples, each tuple having a plurality of attributes, said method comprising the steps of:

partitioning each attribute in the database into partitions spanning contiguous ranges of attribute values, each partition having an occurrence count;

sequentially scanning each tuple in the database and incrementing the occurrence of a partition associated with an attribute value of each of said attributes;

determining when the attribute value is an isolated skew value;

creating a special partition associated with said isolated skew value;

incrementing the occurrence count associated with the special partition;

splitting the partition into a plurality of partitions when the occurrence count exceeds a threshold, responsive to said step of incrementing the occurrence count;

dynamically adjusting the threshold as a function of a percentage of the database that has been scanned;

when all tuples have been scanned once, combining partitions and balancing the occurrence count across combined partitions;

constructing the balanced range-based bitmap indices according to the ranges of attribute values of the combined partitions, responsive to said steps of combining partitions and balancing; and storing the balanced range-based bitmap indices on a computer readable memory, responsive to said step of constructing the balanced range-based bitmap indices.

* * * * *